(No Model.) 2 Sheets—Sheet 2.
J. J. HAMILTON.
COMBINED HAY RAKE AND LOADER.
No. 366,580. Patented July 12, 1887.
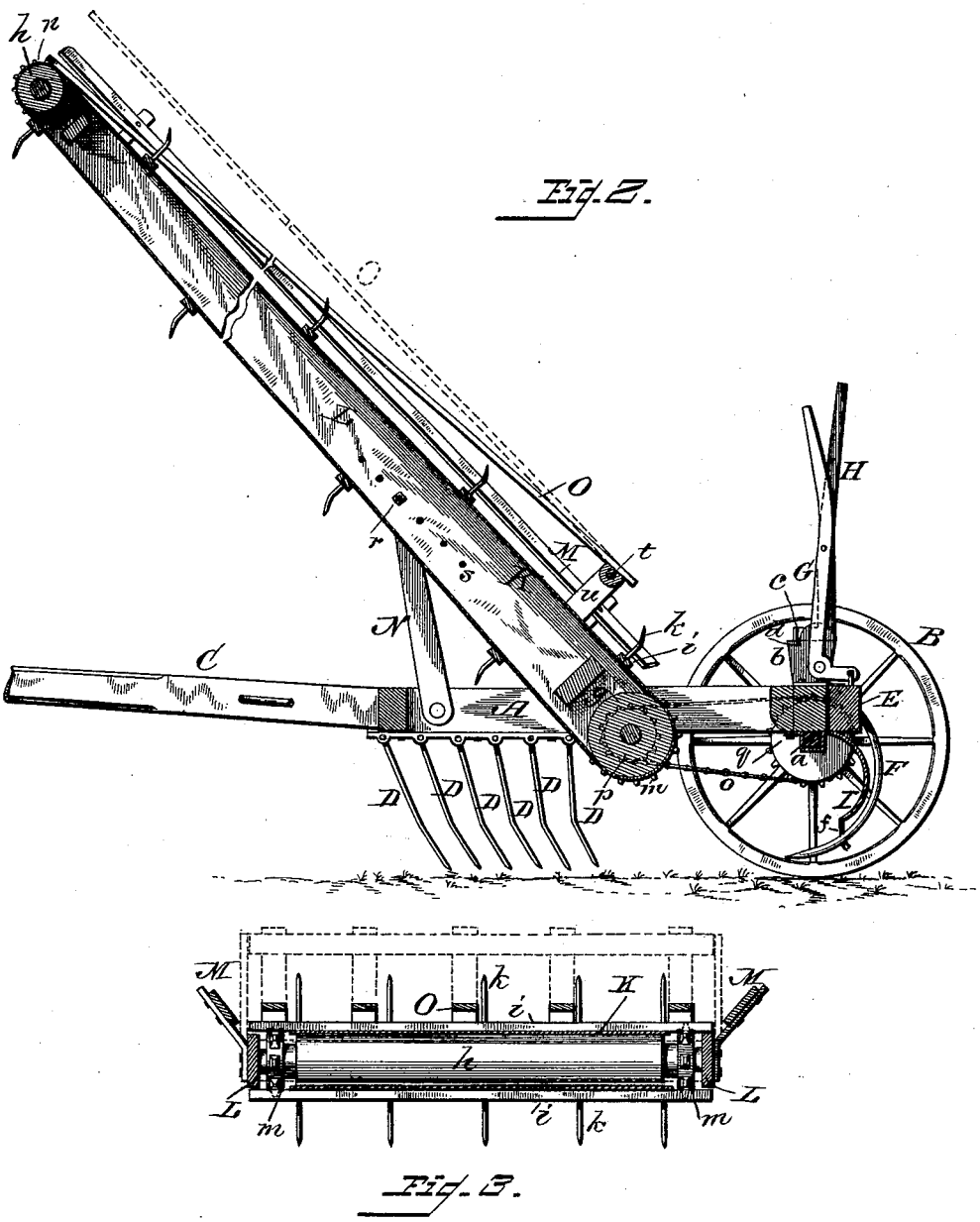
Witnesses
Inventor
James J. Hamilton
By his Attorney Chas. H. Fowler

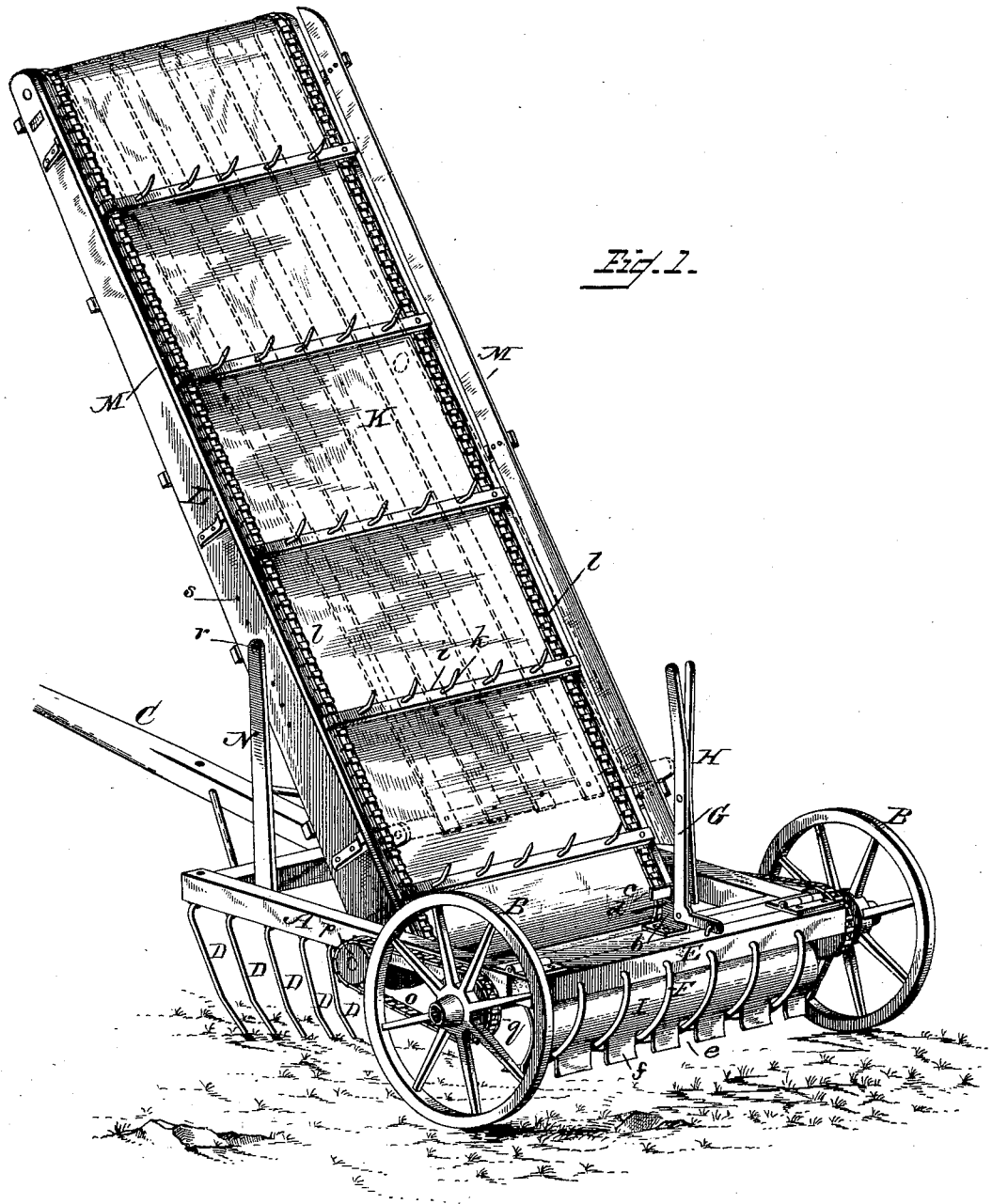

UNITED STATES PATENT OFFICE.

JAMES J. HAMILTON, OF NEW CASTLE, INDIANA.

COMBINED HAY RAKE AND LOADER.

SPECIFICATION forming part of Letters Patent No. 366,580, dated July 12, 1887.

Application filed July 6, 1886. Serial No. 207,173. (No model.)

*To all whom it may concern:*

Be it known that I, JAMES J. HAMILTON, a citizen of the United States, residing at New Castle, in the county of Henry and State of Indiana, have invented certain new and useful Improvements in a Combined Hay Rake and Loader; and I do hereby declare that the following is a full, clear, and exact description of the same, reference being had to the annexed drawings, making a part of this specification, and to the letters and figures of reference marked thereon.

Figure 1 of the drawings is a perspective view of my invention, showing in dotted lines the device for holding down the hay on the endless carrier; Fig. 2, a vertical section thereof, and Fig. 3 a detail sectional view of one end of the carrier and its connections.

The present invention has reference to certain new and useful improvements in a combined hay rake and loader; and it consists in the details of construction, substantially as shown in the drawings, and hereinafter described and claimed.

In the accompanying drawings, A represents a suitable frame, having connected to its rear end a stationary axle, $a$, upon the ends of which are mounted the wheels B, and the forward end of said frame is provided with the usual draft tongue or shaft, C.

To the sides of the frame A are connected rake-teeth D, of any desirable form and construction. As shown in the drawings, they are pivotally secured at their upper ends in sockets attached to the frame, and thus have a free swinging movement in the planes of the sides of the frame. As the draft is applied in a direction at more or less of an angle to the swinging movement of the teeth, it will be observed that there will be more or less binding of the teeth in the sockets, which will be sufficient to keep them in position under ordinary circumstances; but when an obstruction is met with they will give without danger of breaking.

To the rear end of the frame A is hinged a transverse beam or rake-head, E, to which are connected the curved teeth F, and the hinged rake-head is suitably connected to a bell-crank hand-lever, G, which is pivoted to a bracket, $b$, the same being connected to the frame A. Pivoted to the lever G is a lever, H, which has at its lower end a claw, $c$, to engage with a notch, $d$, on the bracket $b$, so as to lock the bell-crank lever and prevent the rake-head from swinging back. The claw is formed by an extension to the lower end of the lever H, which projects a short distance inwardly and at right angles to the length of said lever and thence is bent laterally or sidewise, as shown at $c$, to engage with the notch $d$.

When it is desired to elevate the rake-teeth, the upper end of the lever H, above its pivotal connection, is pressed rearwardly, which will elevate the claw $c$ sufficiently to disengage it from the notch $d$ of the bracket, after which the upper end of the lever G is pressed forwardly, thereby raising the rake-head E with its teeth.

A clearer, I, is provided for the rake-teeth F, said clearer being connected to the frame A in any desirable manner, and extends out under the rake-head, as shown.

The rake-teeth D, as will be noticed, are disposed with relation to each other, as shown, each tooth standing a little farther out in a sidewise or lateral direction as they extend forward, thus arranging them so as to gather the hay in toward the center. The rear teeth, F, may be lifted clear of the ground in passing from one field to another or along the road by means of the lever G. The clearer I is preferably composed of sheet metal, and is curved in front of teeth and has notches $e$ for the lower end of the teeth to pass. This clearer also serves the purpose of assisting to feed the hay onto the loader or elevator, as well as to prevent the hay from clogging against the axle or cross-pieces of the frame. The lips $f$, which are formed by cutting the slots $e$, are turned backward and upward at their lower edges to keep the hay from hanging or sticking. As a means for locking and holding in place the lever G, any well-known device may be substituted for that shown, as I do not desire to be understood as limiting myself to any special means of attaining this end.

The frame A, which is of any desirable shape and form, has journaled to its sides a shaft of a roller, $g$, over which passes an endless belt, K, said belt passing over a second and smaller roller, $h$. This carrier-belt is of the usual construction, and is provided with transverse slats $i$, having teeth $k$. The carrier-belt K operates between the side pieces, L, of a suitable frame, which is supported at its lower end in the frame A by the shaft of the roller g, the upper roller, h, having its bearings in the sides L of the frame. The transverse slats i have their ends projecting beyond the edges of the belt K, and have secured to the under side of their projecting ends sprocket-chains l, these sprocket-chains engaging with sprocket-wheels m on the shaft of the roller g and similar sprocket-wheels n on the shaft of the roller h. Motion is imparted to the belt K by means of a sprocket-chain, o, engaging with a sprocket-wheel, p, on the extremity of one end of the shaft of the roller g and a similar and larger sprocket-wheel, q, on one of the wheels B. Any suitable means, however, may be employed for driving the belt K, and I wish it understood that any suitable arrangement of driving mechanism may be substituted for that shown without departing from the principle of my invention.

The elevator-frame, which consists, principally, of the side pieces, L, is provided with guides M to prevent the hay as it is carried up by the endless belt from working off the sides of the elevator. The elevator-frame may be raised or lowered to any desirable angle, as circumstances require, and is held at its adjusted position by means of standards N. These standards are pivoted at their lower end or otherwise suitably fastened to the frame A, and a pin, r, passes through a hole in the upper end of the standards and engages with one of a series of holes, s, in the sides L of the elevator-frame, thus holding the frame at the angle to which it has been adjusted.

The elevator, if desired, may be disconnected and removed from the frame A, thus enabling the frame with its rake-teeth to be used separately, and any preferred means may be used for holding the elevator in its adjusted position. The sprocket-chains l, which form a part of the endless carrier, serves a very important purpose of guiding and steadying the belt in its movement and rendering its operation more effective.

In order to provide means for holding down the hay on the endless carrier, I employ a series of longitudinal slats, O, extending the entire length, or nearly the entire length, of the elevator. These slats O are supported on a transverse rod, t, at or near the lower end of the elevator, said rod forming a pivot upon which the slats work, the extremities of said rod being connected to short standards u, secured to the elevator-frame. Any suitable means may be employed for pivotally connecting the longitudinal slats O at their lower ends, so as to enable the slats to yield to the pressure of hay under them and at the same time hold the hay down on the belt as it passes up the elevator. The arrangement shown in the drawings, where the slats are secured to a freely-rocking cross-bar, is a simple, effective, and economical construction, as gravity alone is sufficient to give the required pressure and the expense and wear of a spring is avoided. As the hay passes up the elevator, the slats will rise up and let the hay pass under them. The standards u can be either fastened to the elevator-frame or to the rake-frame A.

Having now fully described my invention, what I claim as new, and desire to secure by Letters Patent, is—

1. In a combined hay rake and loader, the combination, with a frame mounted upon wheels and an elevator having its lower end secured in a suitable position on the frame, of two series of rake-teeth diverging from the rear toward the front of the frame, said rake-teeth being pivotally secured in sockets attached to the sides of the frame at right angles to the line of draft, and having a free swinging movement forward and back in the planes of the frame, substantially as set forth.

2. In a combined hay rake and loader, the combination, with the rear teeth secured to a bar hinged to the rear end of the frame so as to swing vertically, of the bell-crank operating-lever pivotally secured to the frame and having connection with the hinged bar, and the bell-crank locking-lever pivotally secured to the said operating-lever, and provided with a claw adapted to engage a stop on the frame, the whole constructed and arranged substantially as set forth.

In testimony that I claim the above I have hereunto subscribed my name in the presence of two witnesses.

JAMES J. HAMILTON.

Witnesses:
 JOHN REA,
 DAVID BEARLY.